United States Patent Office 3,515,353
Patented June 2, 1970

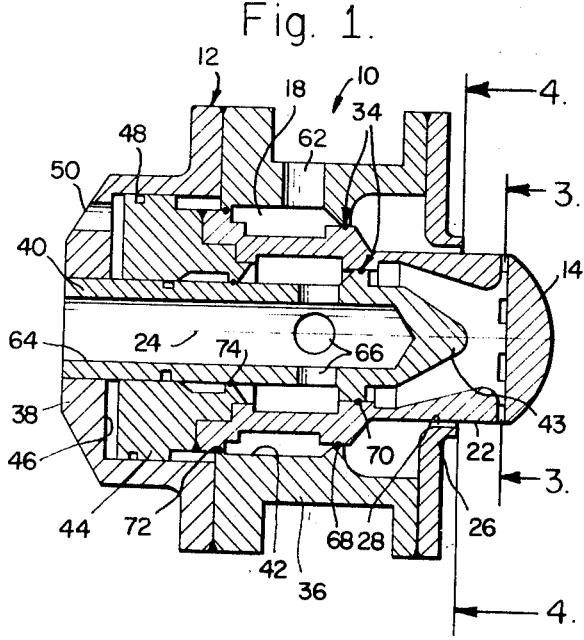

3,515,353
COMBINATION VALVE AND INJECTOR DEVICE FOR CONTROLLING, METERING, AND MIXING TWO FLUIDS
Leparis D. Young, Inglewood, and Antone Potocnik, Redondo Beach, Calif., assignors to TRW Inc., Redondo Beach, Calif., a corporation of Ohio
Filed Jan. 18, 1968, Ser. No. 704,210
Int. Cl. F23d 13/38
U.S. Cl. 239—414                7 Claims

ABSTRACT OF THE DISCLOSURE

A combination valve and injector device for controlling, metering, and mixing two fluids, the device having inner and outer telescoping valve members defining an intervening annular exit orifice means bounded by a cylindrical surface on one member and a confronting annular lip on the other member, and a radial exit orifice means disposed circumferentially about and opening laterally through the cylindrical orifice boundary surface forwardly of the annular orifice means, the valve members being relatively axially movable between valve closed positions wherein the device is sealed against fluid flow to the orifice means and a range of valve open positions wherein fluid is jetted from the radial orifice means into the path of the annular fluid jet emerging through the annular orifice means, and the orifice boundary lip is located intermediate the ends of the cylindrical orifice boundary surface, whereby the valve members may assume any open position within the range without altering the effective areas of the orifice means.

REFERENCE TO RELATED APPLICATION

Reference is made herein to copending application, Ser. No. 683,711, filled Dec. 16, 1967, now Pat. No. 3,464,633, and entitled "Multiple Fluid Controlling Shear Valve."

BACKGROUND OF THE INVENTION

Field of the invention

This invention relates generally to fluid flow regulating devices. More particularly, the invention relates to a combination valve and injector device for controlling, metering, and mixing two fluids.

As will appear from the ensuing description, the combination valve and injector device of the invention may be employed for a variety of fluid controlling, metering, and mixing applications. The principal application of the device, however, involves its use as a bipropellant rocket engine. For this reason, the invention will be disclosed in connection with this particular application.

Prior art

A great variety of injectors have been devised for bipropellant rocket engines. Generally speaking, an injector of this class is designed to jet two different propellants into a rocket engine combustion chamber in such a way that the propellants enter the chamber at predetermined velocity and in predetermined proportions and mix as they enter the chamber. The existing injectors may be generally classified as multiple element and single element injectors. A multiple element injector embodies a multiplicity of orifice means for each propellant. These orifice means are arranged in a predetermined pattern such that the propellants are thoroughly mixed as they emerge from the orifice means into the rocket engine combustion chamber. A single element injector, on the other hand, has a single orifice means for each propellant and is arranged in such a way that one propellant is jetted into the emerging jet stream of the other propellant to effect mixing of the propellants as the latter enters the rocket engine combustion chamber. The present invention is concerned generally with injectors of this latter class.

All rocket engine propellant injection systems, of course, require valve means for controlling propellant flow to the rocket engine, that is blocking propellant flow to the engine until firing of the engine is initiated and then immediately releasing the propellants to the engine to initiate firing. In some single element injection systems, the propellant valve or valves are separate from the injector. Other injection systems of this class employ a combination valve and injector. The present invention is concerned particularly with and provides an improved combination valve and injector device of this type.

The existing combination valve and injector devices of the kind under discussion possess certain inherent deficiencies which this invention seems to overcome. Thus, combination valve and injector devices have telescoping inner and outer valve members which define an intervening annular exit orifice means and a concentric fixed orifice means through which the propellants are jetted into the rocket engine combustion chamber in such a way that the propellant jet streams impinge one another immediately after emerging from the orifice means, thus to effect diffusion or mixing of the propellants. The propellant flow control or valving function of these devices is accomplished by relative axial movement of the valve members between valve closed and valve open positions. A major deficiency of these existing valve and injector devices resides in the fact that any relative axial displacement of the valve members from their normal open position alters the effective area of the annular orifice means and, thereby, the propellant flow rate through this orifice means. As a consequence, precise metering of the propellants, as well as injection of the propellants with optimum entrance velocities, into the rocket engine combustion chamber require extremely accurate relative axial positioning of the valve members in their open positions. The problem, just discussed, is compounded in combustion valve and injector devices for use with rocket engines which are designed to be shut off and restarted in flight, such that precise repositioning of the valve members is required a number of times in flight. At the present state of the art, the only solution to the stated problem involves great precision and extremely small tolerances in the manufacture of the devices and precise positioning of the valve mmebers in their open positions. As a consequence, the existing injector devices of the kind under discussion are difficult and time consuming and hence costly to manufacture, and tend to be unreliable in operation.

SUMMARY OF THE INVENTION

The present invention avoids the above-noted and under deficiencies of the existing combination valve and injector devices by providing an improved device of this kind in which the orifice-defining valve members may assume any open position within a range of open positions without altering the effective area of the annular injector orifice means. As a consequence, extremely accurate positioning of the valve members in their open positions is not essential to obtain precise metering and optimum injection velocities of the propellants jetted from the device into the rocket engine combustion chamber. The tolerances and cost involved in manufacturing the device are also materially reduced.

Briefly, these advantages are achieved by providing a combination valve and injector device of the character described wherein the annular orifice means of the device is bounded about one of its perimeters by a coaxial cylindrical orifice boundary surface on one valve member and about its other perimeter by a coaxial annular orifice boundary lip on the other member, In the two limiting positions of the range of open positions of the valve members, the orifice boundary lip is located intermediate the ends of the cylindrical boundary surface. As a consequence, the radial dimension of the annular orifice means remains constant throughout the range of open positions of the valve members, and the latter may assume any open position within the range without altering the effective area of the annular orifice means. The valve member having the cylindrical orifice boundary surface contains a fixed orifice means which is disposed circumferentially about this surface, forwardly of the annular orifice means, and opens laterally or radially through the cylindrical surface. Accordingly, when the valve members are shifted axially relative to one another to any open position within their range of open positions, one propellant is jetted axially through the annular orifice means as an annular jet stream, and the other propellant is jetted laterally or radially from the fixed orifice means into the path of the annular propellant jet stream to effect mixing or diffusion of the two propellant streams.

As will appear from the ensuing description, the present combination valve and injector device may employ various types of valve means for controlling propellant flow through the device. However, the present injector improvements are uniquely adapted for embodiment in a bi-fluid shear valve like that disclosed in the aforementioned copending application. For this reason, the invention will be disclosed in connection with such a shear valve.

At this point, it is significant to recall that while the invention is particularly concerned with and will be disclosed in connection with the use of the present valve and injector device for injecting two propellants into a bipropellant rocket engine, the device is capable of other applications and may be employed to control, meter, and mix any two fluids.

BRIEF DESCRIPTION OF THE DRAWINGS

FIG. 1 is a longitudinal cross-section through a combination valve and injector device according to the invention showing the device in its closed position;

FIG. 2 is a section similar to FIG. 1 showing the device in its open position;

FIG. 3 is a transverse-section taken on line 3—3 in FIG. 1; and

FIG. 4 is a transverse-section taken on line 4—4 in FIG. 1.

DESCRIPTION OF THE PREFERRED EMBODIMENTS

In general terms, the invention provides a combined valve and injector device, represented in the drawings by the device 10, having slidably telescoping members 12 and 14 which serve as combined valve and injector members. For convenience, these members will be hereinafter referred to as valve members. The outer valve member 12 provides a body for the device. The inner valve member 14 provides a valve obturator. The valve members define an intervening, annular exit orifice means 16 adjacent and opening axially through the front or right hand end of the outer member 12 and a fluid passage 18 communicating with this orifice means for conducting a first fluid under pressure to the orifice means. The fluid emerges axially through this annular orifice means along a generally annular flow path 20. Annular orifice means 16 has inner and outer perimeters and is bounded along one perimeter by a cylindrical orifice boundary surface 22 concentric with the common axis 24 of the valve members and along its other perimeter by an annular radially projecting orifice boundary lip 26 having a circumferential surface 28 confronting and concentric with the cylindrical boundary surface. In the particular valve and injector device of the invention which has been selected for illustration in the drawing, the cylindrical orifice boundary surface 22 is provided by the inner valve member 14 and the orifice boundary lip 26 is provided by the outer valve member 12. It will become evident to those versed in the art as the description proceeds, however, that the positions of the cylindrical orifice boundary surface and annular orifice boundary lip may be reversed; thta is to say, the outer valve member 12 may be provided with the cylindrical orifice boundary surface and the inner valve member 14 may be provided with the orifice boundary lip 26.

The valve member which is provided with the cylindrical orifice boundary surface 22, in this instance the inner obturator member 14, contains a fixed exit orifice means 30 disposed circumferentially about the member adjacent its front end. Orifice means 30 opens laterally or radially through the cylindrical orifice boundary surface 22 toward the annular flow path 20. The orifice means 30 is hereinafter referred to as a radial orifice means. The inner valve member 14 also contains a fluid passage 32 communicating with the radial orifice means for conducting a second fluid under pressure to the latter orifice means.

Valve members 12, 14 are relatively movable along their common axis 24 between valve closed positions illustrated in FIG. 1, and valve open positions, illustrated in FIG. 2. As noted earlier and explained below, a unique feature and advantage of the invention resides in the fact that the valve members may assume any open position within a range of open positions without altering the effective area of the annular orifice means 16. FIG. 2 represents an open position in this range. The valve members are provided with flow obturating means 34 for blocking fluid flow through the valve passages 18, 32 when the members occupy their closed positions and permitting fluid flow through the passage to the orifice means 16, 30 when the members occupy their open positions. In these open positions, the radial orifice means 30 is located forwardly of the annular orifice means 16. The pressurized fluid which is supplied to the valve passage 32 emerges through the radial orifice means as a series of radial jet streams which impinge and mix with the annular fluid jet stream emerging through the annular orifice means 16.

According to the present invention, the cylindrical orifice boundary surface 22 extends to the front extremity of its responsive member, i.e., the inner member 14, and the axial dimension of this surface substantially exceeds that of the orifice boundary lip 26. The valve members 12, 14 may thus assume a number of open positions wherein the lip is located intermediate the ends of the surface. Owing the constant diameter of the boundary surface, the effective area of the annular orifice means 16 remains constant in these several open positions. These several open positions collectively define the range of open positions referred to earlier. In this regard, it will be recalled that the open position depicted in FIG. 2 is an open position within the range. The valve members 12, 14 are thus movable to any open position within the range of open positions without altering the effective area of the annular orifice means 16. It is now evident, therefore, that assuming constant inlet pressures of the two fluids supplied to the present combined valve and injector device 10, the flow rates, injection velocities, and relative proportions of the fluids emerging from the device remain constant throughout its range of open positions. In this regard, it will be understood that the orifice means 16, 30 define the minimum effective cross-sectional areas of the two fluid flow paths through the device throughout the range.

Referring now in greater detail of the drawings, the combined valve and injector device 10 of the invention which has been selected for illustration is intended for use as a bipropellant injector for a bipropellant rocket engine, although it may conceivably be used for other purposes. The outer body member 12 of this device includes an outer tubular section or manifold 36 closed at its rear end by an end wall 38, and an inner tubular section or manifold 40 which extends forwardly from the end wall and concentrically through the outer manifold. The front end of the outer manifold turns inwardly to define the orifice boundary lip 26. This lip has a central opening, the wall of which constitutes the circumferential lip surface 28. The inner manifold 40 is radially spaced from the outer manifold 36 to define an intervening annular chamber 42. The front end of the inner manifold is tapered and terminates substantially flush with the front end of the outer manifold to define an injector pintle 43.

The inner valve member 14 of the illustrated valve and injector device 10 is essentially a sleeve which is concentrically disposed within the annular body chamber 42, in surrounding relation to the inner body manifold 40. At its rear end, that is at its left-hand end in the drawing, the sleeve 14 is radially enlarged to form an annular piston 44. This piston slides within the rear end of the body member 42 which defines an annular cylinder 46 for the piston. The piston is slidably sealed to the wall of the cylinder by O-rings 48. Extending through the rear end wall 38 of the injector valve body 12 is a pressure port 50 communicating to the cylinder 46 behind the piston 44 and adapted for connection to a source of operating fluid under pressure. In the particular injection valve 10 under consideration, the piston 44, cylinder 46, O-rings 48, and pressure ports 50 together constitute a valve operating means 49. The illustrated valve operating means, therefore, is essentially a linear fluid pressure actuator which may be pressurized through the port 50 to drive the inner injector valve sleeve 14 to the right or forwardly relative to the injector valve body 12.

Forwardly of its piston 44, the injector valve sleeve 14 is internally and externally stepped to various diameters, as shown. This stepped configuration of the sleeve provides the later with a relatively radially thick annular land 52 contiguous the piston 44, an adjacent relatively thin annular web 54, a following radially enlarged annular land 56, and a forward cylindrical tip 58. The outer surface of this tip defines the cylindrical orifice boundary surface 22, referred to earlier. The front end of the tip is closed by a generally dome shape end wall 60. Extending radially from the inner edge of the orifice boundary lip 26 are a number of standoff teeth 28a which slidably enlarge the tip 58 to maintain accurate concentricity of the orifice boundary surfaces 22, 28.

The gaps or spaces between these teeth collectively define the annular orifice means 16. The radial orifice means 30 comprise a number of separate radial orifice openings 30a between the sleeve tip 58 and end wall 60.

The injector valve body 12 and injector valve sleeve 14 defines therebetween the two liquid passages 18, 32. More specifically, the sleeve and outer body manifold 36 define therebetween the valve passage 32. Extending through the wall of the outer body manifold 36 a number of inlet ports 62 which open to the outer injector valve passage 18. Entering the rear end of and extending axially through the inner body manifold 40 is an inlet 64 which communicates to the inner passage 32 through ports 66 in the wall of the inner manifold.

When the injector valve 18 is closed, the injector valve sleeve 14 occupies its rear closed position of FIG. 1 within the injector valve body 12. In this position, the sleeve piston 44 is located adjacent the body end wall 38, and the sleeve web section 54 is situated between and in radially spaced confronting relation to the outer and inner manifold ports 62, 66. The sleeve lands 52, 56 are then positioned at axially opposite sides of these ports, and flow through the valve passages 18, 32 is blocked by the flow obturating means 34.

It will be immediately recognized by those versed in the art that various flow obturating means may be employed in the present injector valve. As noted earlier, however, the present invention is uniquely adapted for embodiment in a shear valve of the type disclosed in the aforementioned copending application. For this reason, the invention has been illustrated in connection with such a valve. In this regard, it will be observed that the illustrated flow obturating means 34 comprise a pair of primary shear seals 68, 70 which join the injector valve body 12 and valve sleeve 14 to block flow through the valve passages 18, 32. More specifically, the shear seal 68 joins outer body manifold 36 to the forward sleeve land 56, about their full circumference, and extending transversely across the outer passage 18 to block flow from the inlet ports 62 to the annular orifice means 16. The shear seal 70 joins the inner body manifold 40 to the sleeve land 56, about their full circumference, and extends transversely across the inner passage 32 to block flow from the inlet 64 to the radial orifice means 30. The illustrated shear valve is provided with a pair of secondary shear seals 72, 74 for blocking fluid leakage from the valve passages 18, 32 to the valve operating means 49 which is located at the high pressure side of the primary shear seals. These several shear seals are sheared simultaneouly when the operating means is pressurized to the valve. As explained in the aforementioned copending application and illustrated in the present drawings, the injector valve body 12 and sleeve 14 are constructed in several parts which are joined in any convenient way, as by welding, to permit forming of the several shear seals 68, 70, 72 and 74.

The operation of the illustrated injector valve 10 is obvious from the preceding description. Thus, prior to opening of the device, the injector valve body 12 and sleeve 14 occupy their relative axial positions illustrated in FIG. 1. In these positions, flow through the device is blocked by the shear seals 68, 70, 72, 74. The device is opened by supplying a fluid under pressure to the cylinder 46, behind the piston 44, through the pressure port 50. The sleeve 14 is thereby driven to the right relative to the body 12 to simultaneously shear the several shear seals and thereby permit fluid flow to the annular orifice means 16 and radial orifice means 30. The fluid supplied to the outer injector passage 18 emerges axially through the annular orifice means as an annular jet stream. The fluid supplied to the inner passage 32 emerges through the radial orifice means 30 as a number of radial jet streams which impinge and thereby mix with the emerging annular jet stream.

Opening movement of the sleeve 14 is limited by engagement of the sleeve piston 44 with an internal stop shoulder 76 on the body 12. The body and sleeve are machined in such a way that in the forwarding limiting position of the sleeve, the latter and body will be located within their range of open positions, referred to earlier, wherein the orifice boundary lip 26 is situated intermediate the ends of the cylindrical orifice boundary surface 28.

In this regard, it will be evident that since the body and sleeve may assume a range of open positions without altering the effective area of the annular orifice means 16, the present device may be machined with substantially larger tolerances and hence much less precision than the existing devices of this kind, referred to earlier. As a consequence, the cost of the present injector valve is materially reduced. Another advantage of the invention resides in the fact that the present injector valve may be cycled, i.e., opened and closed a number of times, without accurate repositioning of the sleeve 14 relative to the body 12 and still achieve the same effective annular orifice area each time the device is opened. This feature of the invention, of course, uniquely adapts the present injector valve for use as a bipropellant injector for a bipropellant rocket engine which is shut off and restarted a number of times in flight. In this regard, it should be noted that in the event the device is to be cycled in this way, suitable means will be provided for relatively shifting the body 12 and sleeve 14 in both directions between their open and closed positions. In an atmospheric pressure environment, for example, the cylinder 46 may be simply evacuated to reclose the device. It will be understood, of course, that once the device is opened, the sheared surfaces of the shear seals 34 are utilized to provide a sealing function when the device is reclosed. Secondary seals, such as O-rings, could be provided for this purpose, of course.

While the invention has been disclosed in connection with a combination valve and injector device, or injector valve, wherein the cylindrical orifice boundary surface 22 is on the movable sleeve, it is evident that the position of this surface and the orifice boundary lip 26 may be reversed. That is to say, the body 12 may be provided with the cylindrical boundary surface and the sleeve 14 may be provided with the boundary lip.

It will be immediately evident to those versed in the art that while the invention has been disclosed in connection with one physical embodiment thereof, various modifications of the invention are possible within the spirit and scope of the following claims.

What is claimed as new in support of Letters Patent is:

1. A combination valve and injector device for controlling, metering, and mixing two fluids, comprising:
   a generally tubular outer member having front and rear ends;
   an inner member concentrically disposed within said outer member;
   said members each having a front end face and defining annular exit orifice means surrounding the front end of said inner member and opening axially through the front end face of said outer member and a first fluid passage communicating with said orifice means for conducting one of said fluids under pressure to said orifice means, whereby the latter fluid emerges from said device through said orifice means along a generally annular flow path;
   said orifice means having inner and outer perimeters and being bounded along one perimeter by a cylindrical boundary surface on one member concentric with the common longitudinal axis of said members and along its other perimeter by an annular boundary surface on the other member confronting and concentric with said cylindrical surface;
   said one member containing radial orifice means disposed circumferentially about said one member adjacent the front end face thereof and opening radially through said cylindrical orifice boundary surface toward said first flow path and a second fluid passage communicating with said radial orifice means for conducting the other fluid under pressure to said radial orifice means;
   said members being relatively movable along said axis between valve closed and valve open positions and including obturating means for blocking fluid flow through said passages upon relative movement of said members to said closed positions and permitting fluid flow through said passages upon relative movement of said members to said open positions;
   said members when in their open positions being relatively axially disposed with said radial orifice means located forwardly of said annular orifice means, whereby the fluid emerging through said radial orifice means in the open positions of said members impinges and mixes with the fluid emerging through said annular orifice means; and
   the front end of said cylindrical boundary surface terminating at the front end face of said one member, and said cylindrical surface having substantial length in the axial direction of said members and a constant diameter throughout its length, whereby said members may assume any open position within a range of open positions without altering the effective areas of said orifice means.

2. A combination valve and injector device according to claim 1, wherein:
   said cylindrical orifice boundary surface is on said inner member and said annular boundary surface is on said outer member; and
   said inner member contains said second fluid passage and radial orifice means.

3. A combination valve and injector device for controlling, metering, and mixing two fluids, comprising:
   a body member with front and rear ends and including concentric inner and outer generally tubular sections;
   a valve sleeve member concentrically disposed between said sections in surrounding relation to said inner section;
   said members having front end faces;
   said outer section and sleeve member defining therebetween first annular exit orifice means adjacent and opening axially through the front end of said body member and a first fluid passage communicating with said orifice means for conducting one of said fluids under pressure to said orifice means, whereby said one fluid emerges from said device through said orifice means along a first generally annular flow path;
   said orifice means having inner and outer perimeters and being bounded along one perimeter by a cylindrical boundary surface on one member concentric with the common longitudinal axis of said members and along its other perimeter by an annular boundary surface on the other member confronting and concentric with said cylindrical surface;
   said one member containing second radial exit orifice means disposed circumferentially about said one member adjacent the front end face thereof and opening laterally through said cylindrical orifice boundary surface toward said flow path;
   said inner section and sleeve member defining therebetween a second fluid passage communicating with said radial orifice means for conducting the other fluid under pressure to said radial orifice means;
   said members being relatively movable along said axis between valve closed and valve open positions and including obturating means on said body sections and valve sleeve member for blocking fluid flow through said passages upon relative movement of said members to said closed positions and permitting fluid flow through said passages upon relative movement of said members to said open positions;
   said members when in their open positions being relatively axially disposed with said radial orifice means located forwardly of said annular orifice means, whereby the fluid emerging through said radial orifice means when said members occupy their open positions impinges and mixes with the fluid emerging through said annular orifice means; and
   the front end of said cylindrical boundary surface terminating at the front end face of said one member, and said cylindrical orifice boundary surface having a substantial length in the axial direction of said members and a constant diameter throughout its length whereby said members may assume any open position within a range of open positions without altering the effective areas of said orifice means.

4. A combination valve and injector device according to claim 3, wherein:
   said annular boundary surface is on said outer body section;
   said cylindrical boundary surface is on said sleeve member; and
   said sleeve member contains said second fluid passage and said radial orifice means.

5. A combination valve and injector device according to claim 3, wherein:
   said obturating means comprise a first annular shear seal joining said outer body section and sleeve member and extending radially across said first passage and a second annular shear seal joining said inner body section and sleeve member and extending radially across said second passage; and said seals being sheared simultaneously to open said passages to fluid flow to said orifice means upon relative axial movement of said members to their valve open positions.

6. A combination valve and injector device according to claim 5, including:

valve operating means for relatively moving said members between their valve closed and valve open positions; and coacting means on said members for limiting relative movement of said members to open positions within said range.

7. A combination valve and injector device according to claim 6, wherein:

said operating means comprise an annular piston on the rear end of said sleeve member movable within an annular cylinder within the rear end of said body member, and means for introducing a pressure fluid into said cylinder behind said piston; and said limiting means comprise a stop shoulder on said body member engageable by said piston upon relative movement of said members to their open positions.

References Cited

UNITED STATES PATENTS

| | | | |
|---|---|---|---|
| 1,793,154 | 2/1931 | Bellem et al. | 239—410 |
| 1,798,349 | 3/1931 | Okochi | 239—412 X |
| 1,834,061 | 12/1931 | Joachim | 239—410 |
| 2,368,178 | 1/1945 | Turpin | 239—417 |
| 3,272,441 | 9/1966 | Davis et al. | 239—434 X |
| 3,202,363 | 8/1965 | Krutz et al. | 239—416.4 X |

ROBERT B. REEVES, Primary Examiner

NORMAN L. STACK, Jr., Assistant Examiner

U.S. Cl. X.R.

239—424.5, 434